United States Patent Office 3,392,089
Patented July 9, 1968

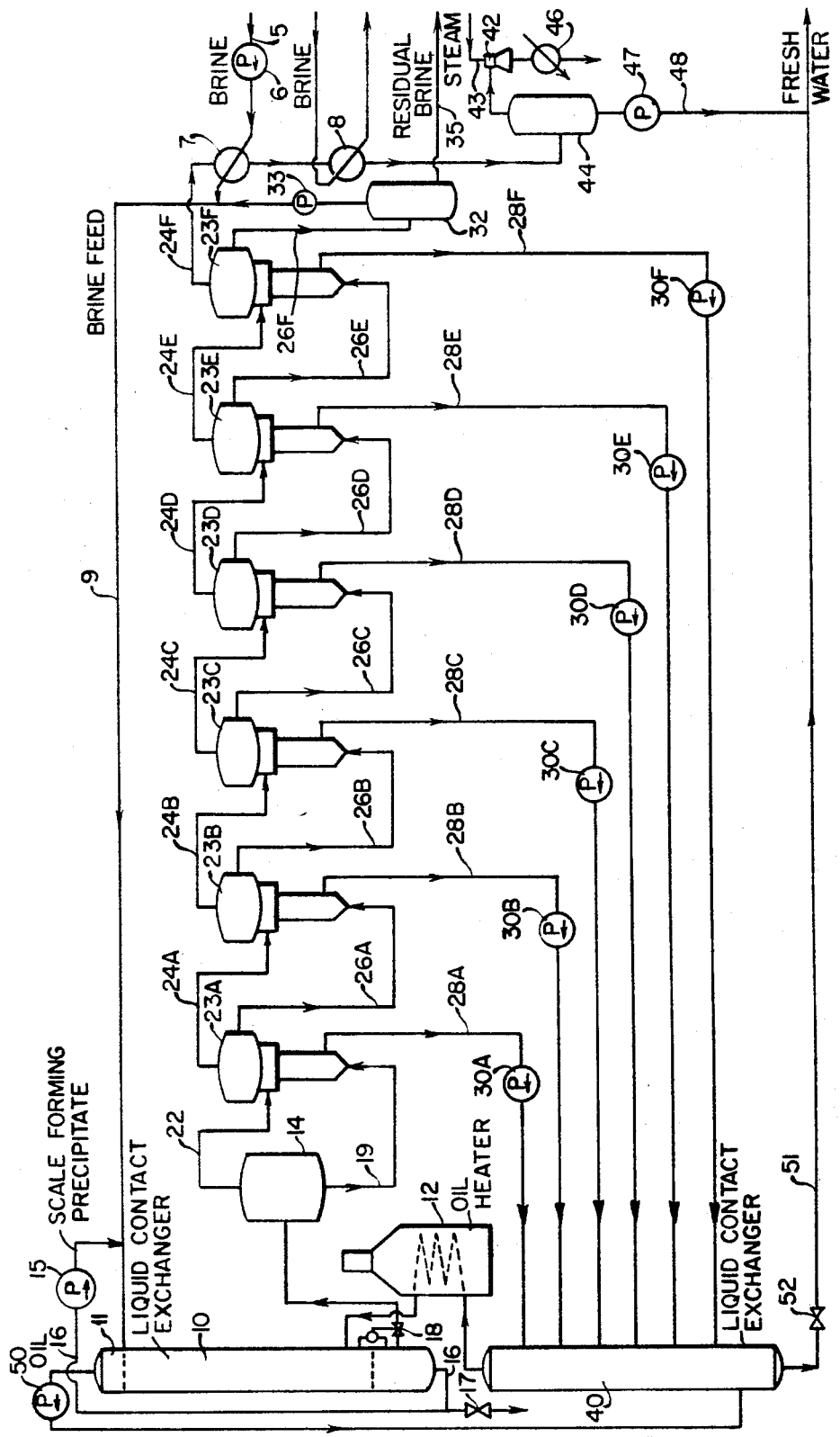

3,392,089
MULTI-EFFECT DESALINATION PROCESS WITH PREHEATING BY DIRECT CONTACT OIL SCALE REMOVING
Frank E. Guptill, Jr., Fishkill, and Howard V. Hess, Glenham, N.Y., assignors to Texaco Inc., New York, N.Y., a corporation of Delaware
Filed June 15, 1964, Ser. No. 375,270
8 Claims. (Cl. 203—7)

ABSTRACT OF THE DISCLOSURE

An evaporation process for the recovery of fresh water from brine in which fresh brine is preheated and scale-forming materials precipitated therefrom by direct heat exchange with hot hydrocarbon liquid prior to introduction of the brine to multiple effect evaporators, and heat is recovered from hot condensate from the evaporators by direct contact with cooler hydrocarbon liquid.

---

The present invention relates to a novel process and apparatus for producing fresh water from brine. The process is applicable to the recovery of salt-free water from brines and to the concentration of various brines for the recovery of soluble salts contained therein.

In one of its more specific aspects, the present invention is concerned with a process for removing water from brine by evaporation, especially with multiple-effect evaporators. Steam or vapor produced in the first evaporator is supplied to the second as a source of heat for vaporization of brine in the second evaporator at a slightly lower pressure than the first evaporator. Similarly, vapor produced in the second evaporator flows to the third evaporator where it supplies heat for vaporization of brine at slightly lower pressure than that of the second evaporator. The pressure and temperature in each of the succeeding evaporators in the series is slightly lower than the pressure and temperature in each preceding evaporator. The present invention provides a means for conserving heat in the plant without the necessity for multiple heat exchangers and, at the same time, effects removal of scale-forming constituents from the brine supplied to the process.

The term "brine" is used in a broad sense to denote the entire range of concentrations of aqueous solutions of water soluble inorganic compounds, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

Preheating of raw brine and recovery of heat from the condensate water from the evaporators are effected by direct heat exchange between brine and hydrocarbon liquid and between condensate water and hydrocarbon liquid. Scale forming materials contained in the brine are precipitated as solids in the brine heater and removed from the system prior to introduction of the hot brine to the evaporators.

Normally liquid hydrocarbons are generally suitable for use in the process of this invention. Hydrocarbons and mixtures of hydrocarbons containing from 6 to 30 carbon atoms per molecule are preferred. Various petroleum fractions including kerosene, naphtha, odorless spirits, gasoline, and lubricating oils may be used. Examples of individual hydrocarbon types which can be used in the process of the present invention, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methycyclohexane, dimethylcyclohexane, ethylcyclohexane, tetralin, isopropylcyclohexane, cyclohexene, pinene, etc.; and aromatic hydrocarbons, e.g., benzene, cumene, xylenes, methylnaphthalenes, etc.

The preferred hydrocarbons are those which have low toxicity and low solubility in water at temperatures in the range of 200 to 350° F. at moderate pressure. In general, the saturated hydrocarbons, especially the paraffins, are preferred for use in the process.

The operating pressure of the heat exchange step is sufficiently high to maintain both the brine and the hydrocarbon in liquid condition at the operating temperatures. Suitable hydrocarbons can be selected which remain in liquid phase at the pressure and temperature best suited to the evaporator system.

The figure illustrates diagrammatically an arrangement of apparatus suitable for carrying out the process of this invention.

In the figure, the improved process of this invention is illustrated in a multiple-effect evaporator plant utilizing six effects or evaporators in series. It is to be understood that the principles of this invention apply regardless of the number of effects in the plant design. The six evaporators illustrated, suitably of the long tube vertical (LTV) type, are designated by the letters A–F, inclusive.

Brine at ambient temperature is drawn from a suitable source of supply through line 5 by pump 6 and passed through condenser 7 and line 9 to the upper end of column 10. In this specific example, sea water containing about 3.5 weight percent salt is supplied through line 5 to a multiple-effect evaporator plant designed to produce one million gallons of fresh water per day. Sea water enters the system at 70° F. at the rate of 416,667 pounds per hour and is heated in condenser 7 to 90° F. and supplied through line 9 to the top of column 10. Additional sea water required for condensation of steam from the evaporators is passed through condenser 8 at the rate of 2,854,000 pounds per hour and discarded at 90° F, Column 10 is a vertical cylindrical vessel maintained full of liquid, with hydrocarbon liquid as the continuous phase and brine as the discontinuous phase. Brine from line 9 is distributed in the hydrocarbon liquid by distributor 11 and flows downwardly in direct contact with upwardly flowing hot hydrocarbon liquid from heater 12. In brine heater 10, the sea water is heated under pressure to a temperature above its boiling point at the pressure maintained in flash drum 14. In this example, the sea water is heated in heater 10 to 380° F. at a pressure of about 235 p.s.i.a. Heating of the sea water causes precipitation of calcium carbonate in the form of sludge which settles to the bottom of vessel 10 and is drawn off with a part of the sea water, as required, through line 16 as controlled by value 17. Removal of calcium carbonate in this manner eliminates, or substantially eliminates, scale formation in the evaporators. Sludge may be recycled, if desired to line 9 for seeding. Hot brine is drawn from the lower part of preheater column 10 through control valve 18 where its pressure is reduced and passed to vessel 14 where steam is flashed from the brine.

Brine leaving flash drum 14, e.g., at 341° F. is passed through line 19 directly to the first evaporator 23A of a series of evaporator units, e.g., long vertical tube evaporators, 23A–23F. The brine passes through the inside of long tubes in the evaporator and is partly vaporized by heat from steam on the outside of the tubes supplied through line 22 at 340° F. and 118 p.s.i.a. from flash vessel 14.

The steam fills the space around and outside of the tubes (not illustrated) causing part of the sea water to boil on the inside of the tubes at reduced pressure, e.g., 67 p.s.i.a. and 300° F. Vapor is discharged from evaporator 23A through line 24A, e.g., at 300° F. and 67 p.s.i.a., to the outside of the tubes of the tube bundle in the next evaporator in the series, evaporator 23B. Hot brine from the first evaporator 23A, e.g., at 301° F., is passed through line 26A to the second evaporator 23B where, under slightly reduced pressure, e.g., 35 p.s.i.a., an additional amount of steam is vaporized from the brine at 260° F. Condensate from evaporator 23A, e.g., at 340° F., is discharged through line 28A in the amount of 453 pounds in this example, and is pumped by pump 30A into the upper end of water cooler column 40. The brine and the steam from each stage in the series of evaporators passes on to the next succeeding stage in sequence (in this example the brine passes through the six evaporators in the series) until the desired concentration of salt in brine is reached, e.g., 21 percent.

In this specific example, the temperatures, in degrees Fahrenheit, and the pressures, in pounds per square inch absolute, for the several stages are:

| Evaporator | Pressure | Temperature |
| --- | --- | --- |
| 14 | 118 | 340 |
| 23A | 67 | 300 |
| 23B | 35 | 260 |
| 23C | 17 | 220 |
| 23D | 7.5 | 180 |
| 23E | 2.9 | 140 |
| 23F | 0.9 | 100 |

Brine from the final stage evaporator 23F is discharged through line 26F to separator 32 where any hydrocarbon carried over from heater 10 is separated from the brine and returned to the heater by pump 33 through line 9. Residual brine, e.g., at 100° F. and 21.0 percent salt concentration is discharged through line 35 at the rate of 69,580 pounds per hour and is discarded or processed from the recovery of salts, e.g., by evaporative cooling in large ponds.

Condensate streams from the evaporators are discharged through lines 28A–28F and pumped by pumps 30A–30F to water cooler column 40, the streams entering the column 40 at successively lower points. Steam from the last evaporator in the series, in this example evaporator 23F, is discharged through line 24F to condensers 7 and 8 where the steam is condensed by indirect heat exchange with brine. Subatmospheric pressure is maintained in evaporators D, E and F in this example by means of a steam ejector 42 to which steam is supplied from line 43 to draw uncondensable gases from accumulator 44 maintained at the pressure of the last evaporator, in this example, at 0.9 p.s.i.a. Steam from the steam ejector 42 is condensed in a condenser 46, suitably by indirect heat exchange with brine. Condensate from evaporator 23F, condensed in condensers 7 and 8, is pumped by pump 47 into line 48.

In this specific example, the quantities, in pounds per hour, and temperatures, in ° F., for the various condensate streams are as follows:

| Stream | Amount | Temperature |
| --- | --- | --- |
| 28A | 18,875 | 340 |
| 28B | 34,792 | 300 |
| 28C | 47,208 | 260 |
| 28D | 55,985 | 220 |
| 28E | 61,792 | 180 |
| 28F | 64,375 | 140 |
| 48 | 64,083 | 80 |

Condensate from the evaporator, discharged through lines 28A–28F to water cooler 40, is cooled by direct contact with hydrocarbon oil, in this example kerosene, circulated through water cooler 40 and brine heater 10 by pump 50 at the rate of 1,802,000 pounds per hour. The condensate is cooled to about 100° F. and discharged as product through line 51 as controlled by valve 52, to combine with condensate from line 48. The total product condensate water in this example amounts to one million gallons per day.

Conventional plants employing multiple-effect long tube vertical evaporators are described in Saline Water Conversion Reports, Office of Saline Water, U.S. Department of Interior, e.g., pages 108–110 of the report for 1960, pages 80–87 of the report for 1961, and pages 103–111 of the report for 1962. In conventional plants, a sea water pump and a heat exchanger are required for each effect. A seven effect plant, for example, requires seven condensate heat exchangers and seven brine heat exchangers to transfer heat by indirect heat exchange to the incoming sea water. By comparison, the plant illustrated in the figure eliminates the fourteen indirect heat exchangers. The present invention eliminates the troublesome indirect heat exchangers, with their inevitable fouling problems, and at the same time achieves removal of scale forming materials from the sea water to reduce fouling in the evaporators.

We claim:

1. In an evaporation process employing a multiple-effect evaporator system, the improvement which comprises passing relatively cool aqueous feed liquor into direct countercurrent contact with relatively hot hydrocarbon liquid in a first contacting zone whereby said hydrocarbon is cooled and said feed liquor is heated, withdrawing resulting preheated liquor from said first contacting zone and passing said preheated liquor to said multiple-effect evaporator system, withdrawing condensate from each successive effect of said evaporator system, withdrawing cool hydrocarbon liquid from said first contacting zone, passing condensates from successive evaporators in said multiple-effect evaporator system to a second contacting zone into direct countercurrent contact with cool hydrocarbon liquid from said first contacting zone wherein cooler condensate from a succeeding evaporator is introduced at a lower level than that of warmer condensate from a preceding evaporator in said system thereby heating said hydrocarbon liquid and cooling said condensate, withdrawing heated hydrocarbon from said second contacting zone and passing heated hydrocarbon from said second contacting zone to said first contacting zone, and withdrawing cooled condensate from said second contacting zone.

2. A process according to claim 1 wherein hydrocarbon is in the continuous phase in said contacting zones.

3. A process according to claim 1 wherein hydrocarbon liquid is in the continuous phase in said first contacting zone and water is the continuous phase in said second contacting zone.

4. A process according to claim 1 wherein each successive effect relative to the flow of liquor is at a successively lower pressure.

5. A process according to claim 1 wherein said feed liquor is heated in said first contacting zone to a temperature higher than in any of the evaporators whereby scale-forming materials in said feed liquor are precipitated as solid precipitate and liquor substantially free from said scale forming materials is supplied to said evaporators.

6. A process according to claim 1 wherein said heated hydrocarbon withdrawn from said second contacting zone is further heated prior to its introduction into said first contacting zone.

7. A process according to claim 1 wherein said hydrocarbon is heated by an amount sufficient to supply all of the heat requirements for the multiple-effect evaporator system.

8. In an evaporation process for the vaporization of water from aqueous liquor containing scale-forming constituents, the improvement which comprises heating said aqueous liquor to a temperature above its boiling point under sufficient pressure to prevent vaporization by passing relatively cool feed liquor into direct countercurrent contact with relatively hot hydrocarbon liquid in a first contacting zone whereby said hydrocarbon is cooled and said liquor is heated and scale-forming constituents precipitated as solid precipitate, withdrawing preheated liquor substantially free from solid precipitate from said contacting zone, separately withdrawing preheated liquor containing solid precipitate from said contacting zone and recirculating solid precipitate formed in said contacting zone in the withdrawn preheated liquor to said contacting zone with relatively cool feed liquor.

References Cited

UNITED STATES PATENTS

| | | | |
|---|---|---|---|
| 2,165,044 | 7/1939 | Fox et al. | 202—174 |
| 3,203,873 | 8/1965 | Wirth | 203—7 |
| 3,219,554 | 11/1965 | Woodward | 203—11 X |
| 3,232,847 | 2/1966 | Hoff | 202—173 X |

FOREIGN PATENTS 387,628   5/1963   Japan.

OTHER REFERENCES

Chemical Engineering, October 1956, pages 130, 132, 126 and 128.

1962 Saline Water Conversion Report, United States Department of the Interior, January 1963, pages 49, 51, 52 and 55.

1963 Saline Water Conversion Report, United States Department of the Interior, April 1964, pages 132, 134 and 135 to 138.

NORMAN YUDKOFF, *Primary Examiner.*

D. EDWARDS, *Assistant Examiner.*